United States Patent Office 3,491,045
Patented Jan. 20, 1970

3,491,045
CROSSLINKED BITUMEN-FURFURYL
ALCOHOL RESIN
Ignatius Metil, Buffalo, N.Y., assignor to Amercoat Corporation, Brea, Calif.
No Drawing. Filed Nov. 17, 1965, Ser. No. 508,369
Int. Cl. C08h 13/08
U.S. Cl. 260—28                                    6 Claims

ABSTRACT OF THE DISCLOSURE

Coating compounds and mortars containing bitumen are obtained by adding bitumen to a uniform solution of homopolymer of furfuryl alcohol and furfural according to the U.S. Pat. 3,168,494 and admixing this liquid with an acidic filler which includes an acidic ingredient in sufficient amount to initiate curing of the admixture.

---

The present invention relates to coating compounds and mortars derived from bitumens and homopolymerized furfuryl alcohol resin crosslinked with furfural.

In a previous patent granted Feb. 2, 1965, under No. 3,168,494, I have described a final resin prepared by crosslinking the homopolymer of furfuryl alcohol using furfural as the crosslinking agent, an outstanding characteristic of the final resin so produced being its resistance to chemicals and particularly its resistance to solvents and to the lower fatty acids.

Bitumens, including solid, liquid and plastic tars and pitches, asphalt and coal tar, are good cements, mortars and coating materials and are widely used in those environments where the product does not come in contact with solvents.

The use of bitumens is restricted by reason of their thermoplastic characteristics, the ready softening which occurs at moderately elevated temperatures, low compression strength and by reason of the easy dissolution of bitumens in common organic solvents, as for instance, benzene, xylene, acetone and the chlorinated hydrocarbons.

It is an object of the present invention so to modify bitumens that they become thermoset, are solvent insoluble, are not readily softened by heat, and acquire a desirable high compression strength.

In broad outline of the invention, I am able to obtain these desirable results by reacting bitumen and a homopolymer of furfuryl alcohol, with furfural. This reaction takes place very readily in an acidic environment. Thus, a reaction mixture of filler or aggregate, bitumen, homopolymer of furfuryl alcohol and furfural is generally activated by an acid catalyst of the type well known and used with furfuryl alcohol-aldehyde systems.

The catalyst includes acidic materials such as dilute inorganic acids, acidic inorganic salts, acidic organic salts. Since the reaction of curing, setting or crosslinking of the present invention is produced upon contact of resin with the catalytic acidic material, the composition capable of being crosslinked is generally supplied in a so-called two-can system. Generally, solid acidic materials are recommended as catalysts, as for instance aniline hydrochloride, sodium acid sulfate, toluene sulfonic acid and the usual acids generally employed in such systems, and these are generally mixed with and carried in the solid filler. When this acidic filler mix is distributed throughout the bitumen, furfuryl alcohol homopolymer and furfural, curing and hardening of the whole mix proceeds at once.

The reaction between the bitumen, homopolymer of furfuryl alcohol and furfural increases in rapidity in proportion to the temperature and acidity of the whole mix. The final set product increases in compression strength and decrease in solubility of the bitumen in solvents, that is, it induces spatial characteristics in the end product. This reaction is believed to be a crosslinking reaction wherein both the bitumen and the homopolymer of furfuryl alcohol enter into reaction with the furfural. Whereas the bitumen in the mixture, prior to the reaction, is extractable with benzene, it cannot be extracted from the final crosslinked resin by any of the common solvents, such as acetone, benzene, trichloroethylene, and the like, the final resin possessing a high compression strength after being immersed in the solvent for long periods of time.

Since bitumens are mostly employed as mortars and coating compositions in conjunction with fillers and aggregates, called fillers herein, the invention will be illustrated in compositions containing powdered fillers. The fillers generally employed are organic fillers or inorganic fillers. The organic fillers include ground shells or hulls, wood flour and the like. The inorganic fillers include ground pyrophyllite, shredded asbestos, silica and other normally employed aggregate, such as sand.

The amount and type of filler in the mix to be crosslinked will vary depending upon the use to which the crosslinked product is to be put and the particular wear it is required to resist. The filler most generally employed will be those of inorganic nature. The filler, based upon the resin-forming ingredients, when employed, will be from a few percent to as much as 80%, although it will generally be in the range 30% to 85%. In the examples below, a standard filler was used in proportions of 3 to 1 with the resinous composition.

STANDARD AGGREGATE FOR TEST PURPOSES

In the experiments listed below, a standard aggregate mix has been employed and included in the reactive resin-producing materials, and samples cast in standard ASTM fashion, the samples being tested for compression strength before immersion in solvents and before immersion in acid or alkali and then tested after immersion in solvents and in acid or alkali, as the case may be.

It will be noted that, in following standard practice in a two-can system, there is included in the ground aggregate, acidic materials of a type and in an amount capable of producing the required acid environment for crosslinking when the solid constituent, i.e., the aggregate plus catalyst, is mixed with the liquid constituent, that is, coal tar and furfural having furfuryl alcohol homopolymer dissolved therein.

In order that there be a considerable amount of catalyst of uniform composition, aniline hydrochloride was mixed with coke flour and sodium bisulfate. This flour carrying the catalysts was mixed with aggregate such as sand, silica gel, and asbestos flour, in such proportions capable of producing mortars with equal reactivity, the standard aggregate being asbestos flour 100 mesh, 2041 parts by weight, silica gel 200 mesh, 682 parts by weight, sand 80 mesh, 1580 parts by weight.

The test pieces were prepared by mixing three parts by weight of above powder to sufficient amount of the resin-forming ingredients to produce in set product, one part by weight of final resin.

STANDARD RESINS FOR TEST PURPOSES

A uniform solution of homopolymer of furfuryl alcohol of a viscosity 40–60 poises and furfural was prepared by procedure of U.S. Patent 3,168,494. This solution was added to coal tar in amount: 0, 20, 50 and 80%. These aliquots were mixed in proportion of 1:3 parts by weight with the standard powdered fillers described above. The four samples were cast in standard molds and permitted to cure and harden. The samples were tested by usual ASTM procedures with the following results:

EXAMPLE 1

|  | Bitumen | | | |
| --- | --- | --- | --- | --- |
|  | 100% | 80% | 50% | 20% |
| (a) Compression strength (p.s.i.) after 7 days cure at 75± 5° F. | Soft, no compression. | 378 | 2,126 | 8,152 |
| (b) Cured as in (a) and after 7 days immersion in: |  |  |  |  |
| Benzene | No compression | 320 | 1,634 | 9,554 |
| Trichloroethylene | do | 367 | 1,439 | 9,222 |
| Acetone | do | 0 | 933 | 5,328 |

Other bitumens diluted by homopolymer with furfural were tested:

EXAMPLE 2

| Bitumen | 20% coal tar | 20% coal tar pitch | 20% asphalt |
| --- | --- | --- | --- |
| (a) Compression strength, p.s.i., cured as in Example 1 (a) | 9,235 | 9,602 | 7,294 |
| (b) Chemical resistance after cure as in Example 1(a) and 7 day immersion in: |  |  |  |
| Benzene | 9,808 | 9,965 | 7,643 |
| Trichloroethylene | 9,554 | 10,169 | 7,224 |
| Acetone | 5,732 | 6,729 | 4,298 |
| 50% $H_2SO_4$ | 9,554 | 10,296 | 7,388 |
| 20% NaOH | 8,497 | 9,511 | 6,369 |

Examination of the immersion vehicle showed no bitumen extracted from the cured and crosslinked final product.

Bitumen with furfuryl alcohol homopolymer containing furfuryl alcohol instead of furfural demonstrates lack of spatial characteristics:

EXAMPLE 3

|  | 20% bitumen | 20% bitumen |
| --- | --- | --- |
| Homopolymer diluent | Furfuryl alcohol | Furfural. |
| (a) Compression strength, p.s.i., after cure as in Example 1(a). | 1,927 | 9,235. |
| (b) Chemical resistance after cure as in Example 1(a) and 7 days' immersion in: |  |  |
| Acetone | Cracked [1] | 5,732. |
| Benzene | 509 [1] | 9,808. |
| Trichloroethylene | Cracked [1] | 9,554. |

[1] Immersion vehicle extracted large amounts of bitumen.

These experiments show that the reaction between the bitumen, homopolymer of furfuryl alcohol and furfural, increases compression strength and decreases the solubility of the bitumen and homopolymer in solvents. That is, it induces spatial characteristics in the end product and is a crosslinking reaction wherein both the bitumen and the homopolymer enter into the reaction with the furfural. Whereas the bitumen in the mixture is extractable with benzene prior to the reaction, it cannot be extracted from the final crosslinked resin by any of the common solvents, such as acetone, benzene, trichloroethylene, and the like, the final resin possessing a high compression strength after being immersed in the solvent for long periods of time.

What is claimed is:
1. A composition containing bitumen and capable of being cured to a hard, set final resin, consisting essentially of,
  (a) a liquid composition consisting of condensation homopolymer of furfuryl alcohol having a viscosity in the range of 30–200 poises formed by polymerizing furfuryl alcohol in an acidic environment free of furfural, furfural in the amount of 10 to 400% of the weight of the homopolymer, and bitumen, the bitumen being present in amount of not more than 50% of the homopolymer and furfural, and
  (b) a solid ingredient consisting of filler in amount of from 30–85% of the mixture of (a) and (b) and
  (c) an acidic ingredient of the type used as an acid catalyst with furfuryl alcohol-aldehyde systems in sufficient amount to cure the admixture of (a) and (b).
2. A composition according to claim 1 wherein the bitumen is present in amount of 20% of (a).
3. A composition according to claim 2 wherein the liquid ingredient (a) is present in amount of one part by weight to three parts by weight of the solid ingredient (b).
4. A composition according to claim 3 wherein the condensation homopolymer has a viscosity of 40–60 poises.
5. The method of producing a hardened, set and cured resin containing bitumen which comprises:
  heating furfuryl alcohol in an acidic environment and in the absence of furfural until a condensation homopolymer possessing a viscosity of 30–200 poises is produced,
  adding an alkali to neutralize the acidic environment,
  separating the condensation polymer from the reaction environment,
  adding furfural and bitumen to the condensation polymer, the furfural being in the amount of 10% to 400% by weight based upon the weight of the condensation polymer and the bitumen being in the amount of 20% by weight based upon the weight of the condensation polymer and furfural,
  and then curing the admixture of condensation polymer, furfural and bitumen by contacting same with a filler containing an acidic ingredient in sufficient amount to cure such admixture.
6. The method according to claim 5 wherein said filler and admixture are present in the ratio of 3:1 by weight.

References Cited

UNITED STATES PATENTS 3,168,494  2/1965  Metil _____ 260—37

JULIUS FROME, Primary Examiner

J. B. EVANS, Assistant Examiner

U.S. Cl. X.R.
106—280, 281, 284